(12) United States Patent
Liu et al.

(10) Patent No.: US 11,848,604 B2
(45) Date of Patent: Dec. 19, 2023

(54) SINGLE-STAGE AC-DC CONVERTER CIRCUIT WITH POWER FACTOR CORRECTION FUNCTION

(71) Applicant: Shenzhen Vmax New Energy Co.,Ltd., Guangdong (CN)

(72) Inventors: Jun Liu, Guangdong (CN); Yingying Feng, Guangdong (CN); Shun Yao, Guangdong (CN); Jinzhu Xu, Guangdong (CN)

(73) Assignee: SHENZHEN VMAX NEW ENERGY CO., LTD., Guangdong (CN)

( * ) Notice: Subject to any disclaimer, the term of this patent is extended or adjusted under 35 U.S.C. 154(b) by 407 days.

(21) Appl. No.: 17/321,748

(22) Filed: May 17, 2021

(65) Prior Publication Data

US 2021/0273557 A1  Sep. 2, 2021

Related U.S. Application Data

(63) Continuation of application No. PCT/CN2020/101119, filed on Jul. 9, 2020.

(30) Foreign Application Priority Data

Aug. 14, 2019 (CN) .......................... 201910750877.5

(51) Int. Cl.
  *H02M 1/42* (2007.01)
  *H02M 7/219* (2006.01)
  *H02M 3/335* (2006.01)

(52) U.S. Cl.
  CPC ....... *H02M 1/4233* (2013.01); *H02M 1/4208* (2013.01); *H02M 1/4216* (2013.01); *H02M 7/219* (2013.01); *H02M 3/33592* (2013.01)

(58) Field of Classification Search
  CPC .... H02M 1/42; H02M 1/4208; H02M 1/4216; H02M 1/4233; H02M 3/335; H02M 3/33576; H02M 3/33592; H02M 7/219
  See application file for complete search history.

(56) References Cited

U.S. PATENT DOCUMENTS

2020/0412238 A1* 12/2020 Zhu ..................... H02M 1/4233

FOREIGN PATENT DOCUMENTS

| CN | 201146458 Y | 11/2008 |
| CN | 109039116 A | 12/2018 |

(Continued)

OTHER PUBLICATIONS

International Search Report of PCT/CN2020/101119, dated Jul. 9, 2020.

*Primary Examiner* — Gary L Laxton
(74) *Attorney, Agent, or Firm* — Locke Lord LLP; Tim Tingkang Xia, Esq.

(57) ABSTRACT

A single-stage AC-DC converter circuit with a power factor correction function. The single-stage AC-DC converter circuit comprises a primary-side AC-DC converter, a transformer, a secondary-side AC-DC converter and a controller which are connected to each other. The primary-side AC-DC converter is configured to convert an AC power source into DC. The secondary-side AC-DC converter is configured to convert electrical energy into DC and supply power to a load. The controller is configured to control duty ratios of power switches in the primary-side and secondary-side AC-DC converters, and a phase difference between control signals for the power switches, and finally control the amount of electrical energy transfer and correct a power factor. The single-stage AC-DC converter circuit of the present invention reduces the capacity and volume of a filter (Continued)

inductor and a voltage stabilizing capacitor, and has the advantages of simple circuit and low cost.

10 Claims, 7 Drawing Sheets

(56) References Cited

FOREIGN PATENT DOCUMENTS

| | | | |
|---|---|---|---|
| CN | 110112935 A | 8/2019 | |
| CN | 110492769 A | 11/2019 | |
| CN | 210431253 U | 4/2020 | |
| EP | 1528664 A2 * | 5/2005 | ............. H02M 1/12 |
| JP | 2016019391 A | 2/2016 | |

* cited by examiner

SINGLE-STAGE AC-DC CONVERTER CIRCUIT WITH POWER FACTOR CORRECTION FUNCTION

CROSS-REFERENCE TO RELATED PATENT APPLICATION

This application is a continuation application of International Patent Application No. PCT/CN2020/101119, filed on Jul. 9, 2020, which itself claims priority to Chinese Patent Application No. CN201910750877.5 filed in China on Aug. 14, 2019. The disclosures of the above applications are incorporated herein in their entireties by reference.

TECHNICAL FIELD

The present invention relates to the field of power electronics, in particular to a single-stage three-phase isolated AC-DC converter circuit with a power factor correction function.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the increasing requirements for energy saving, emission reduction and air pollution control, high-power electrical equipment represented by electric vehicles is gradually being commercialized in the market. A power source serves as a main medium through which electrical equipment obtains energy from a power grid. In order to reduce the harmonic pollution of a power grid current when the electrical equipment is operating, the power source must have a power factor correction function. In the related art, a power factor correction module has a two-stage structure that serves as a front stage of the power source to supply a stable input voltage to an isolated DC converter in a rear stage. This structure requires a higher filter inductor and a larger voltage stabilizing capacitor, resulting in a larger volume of a charging source module and an increase in cost.

Therefore, how to design a single-stage AC-DC converter circuit with a power factor correction function is a technical problem to be solved urgently in the industry.

SUMMARY

In order to solve the above defects existing in the related art, the present invention proposes a single-stage three-phase isolated AC-DC converter circuit with a power factor correction function.

The technical scheme adopted by the present invention is to design a single-stage AC-DC converter circuit with a power factor correction function. The single-stage AC-DC converter circuit comprises a primary-side AC-DC converter, a transformer, a secondary-side AC-DC converter and a controller, wherein the primary AC-DC converter is configured to convert an AC power source into DC, and then supply power to a primary-side winding of the transformer; the primary-side winding of the transformer is connected to a DC output side of the primary-side AC-DC converter and the AC power source, and a secondary-side winding of the transformer is connected to an AC input side of the secondary-side AC-DC converter and a DC output side of the secondary-side AC-DC converter; the secondary-side AC-DC converter is configured to receive electric energy from the secondary-side winding of the transformer, and convert the electric energy into DC and supply power to a load; and the controller is configured to control duty ratios of power switches in the primary-side and secondary-side AC-DC converters, and a phase difference between control signals for the power switches in the primary-side and secondary-side AC-DC converters so as to control the amount of electrical energy transfer and correct a power factor.

The AC power source is a three-phase alternating current; the primary-side AC-DC converter and the secondary-side AC-DC converter are three-phase bridge-type controllable rectifier circuits; and the transformer is a three-phase transformer.

A first voltage stabilizing module is connected between an anode and a cathode of the DC output side of the primary-side AC-DC converter; the first voltage stabilizing module comprises a first capacitor C1 and a second capacitor C2 which are connected in series; a connection point between the first capacitor C1 and the second capacitor C2 is a primary-side common neutral point, which is respectively connected to the heads of windings in respective phases on the primary side of the transformer through a third capacitor C3, a fourth capacitor C4 and a fifth capacitor C5; the tails of the windings in respective phases are correspondingly connected to respective phase lines of the AC input side of the primary-side AC-DC converter through an A-phase high-frequency inductor $L\sigma a$, a B-phase high-frequency inductor $L\sigma b$, and a C-phase high-frequency inductor $L\sigma c$ respectively; a second voltage stabilizing module is connected between an anode and a cathode of the DC output side of the secondary-side AC-DC converter; the second voltage stabilizing module comprises a sixth capacitor C6 and a seventh capacitor C7 which are connected in series; a connection point between the sixth capacitor C6 and the seventh capacitor C7 is a secondary-side common neutral point, which is respectively connected to the heads of windings in respective phases on the secondary side of the transformer through an eighth capacitor C8, a ninth capacitor C9 and a tenth capacitor C10; the tails of the windings in respective phases are correspondingly connected to respective phase lines of the AC input side of the secondary-side AC-DC converter; the AC input side of the primary-side AC-DC converter is respectively connected to three phase lines of the AC power source through an A-phase inductor La, a B-phase inductor Lb, and a C-phase inductor Lc.

The A-phase high-frequency inductor $L\sigma a$, the B-phase high-frequency inductor $L\sigma b$, and the C-phase high-frequency inductor $L\sigma c$ are made into leakage inductors and integrated in the converter.

The converter has an A phase, a B phase and a C phase; a primary-side winding and a secondary-side winding of the A phase are wound on an A-phase magnetic column; a primary-side winding and a secondary-side winding of the B phase are wound on a B-phase magnetic column; and a primary-side winding and a secondary-side winding of the C phase are wound on a C-phase magnetic column.

The axes of the A-phase, B-phase and C-phase magnetic columns are arranged in a triangular shape, and the three magnetic columns share a top magnetic circuit and a bottom magnetic circuit.

The axes of the A-phase, B-phase and C-phase magnetic columns are arranged in a straight line, and the three magnetic columns share a top magnetic circuit and a bottom magnetic circuit.

The power switches in the primary-side AC-DC converter and the secondary-side AC-DC converter are silicon carbide switches.

The controller drives the control signals for the power switches in the primary-side AC-DC converter and the secondary-side AC-DC converter to adopt the same switching frequency.

The technical solution of the present invention has the following beneficial effects: a single-stage AC-DC power conversion topology is adopted, and the AC input terminal and the DC output terminal are isolated by a transformer; the power factor can be conveniently corrected by adjusting the duty ratios and phase shift; the capacity and volume of the filter inductor and the voltage stabilizing capacitor are reduced; and the single-stage AC-DC converter circuit has the advantages of simple circuit and low cost.

BRIEF DESCRIPTION OF THE DRAWINGS

The present invention will be described in detail below in conjunction with embodiments and accompanying drawings, in which.

DETAILED DESCRIPTION

In order to make the objects, technical solutions and advantages of the present invention clearer, the following will describe the present invention in detail in conjunction with accompany drawings and embodiments. It should be understood that the specific embodiments described here are only used to explain the present invention, but not used to limit the present invention.

Figure 1:
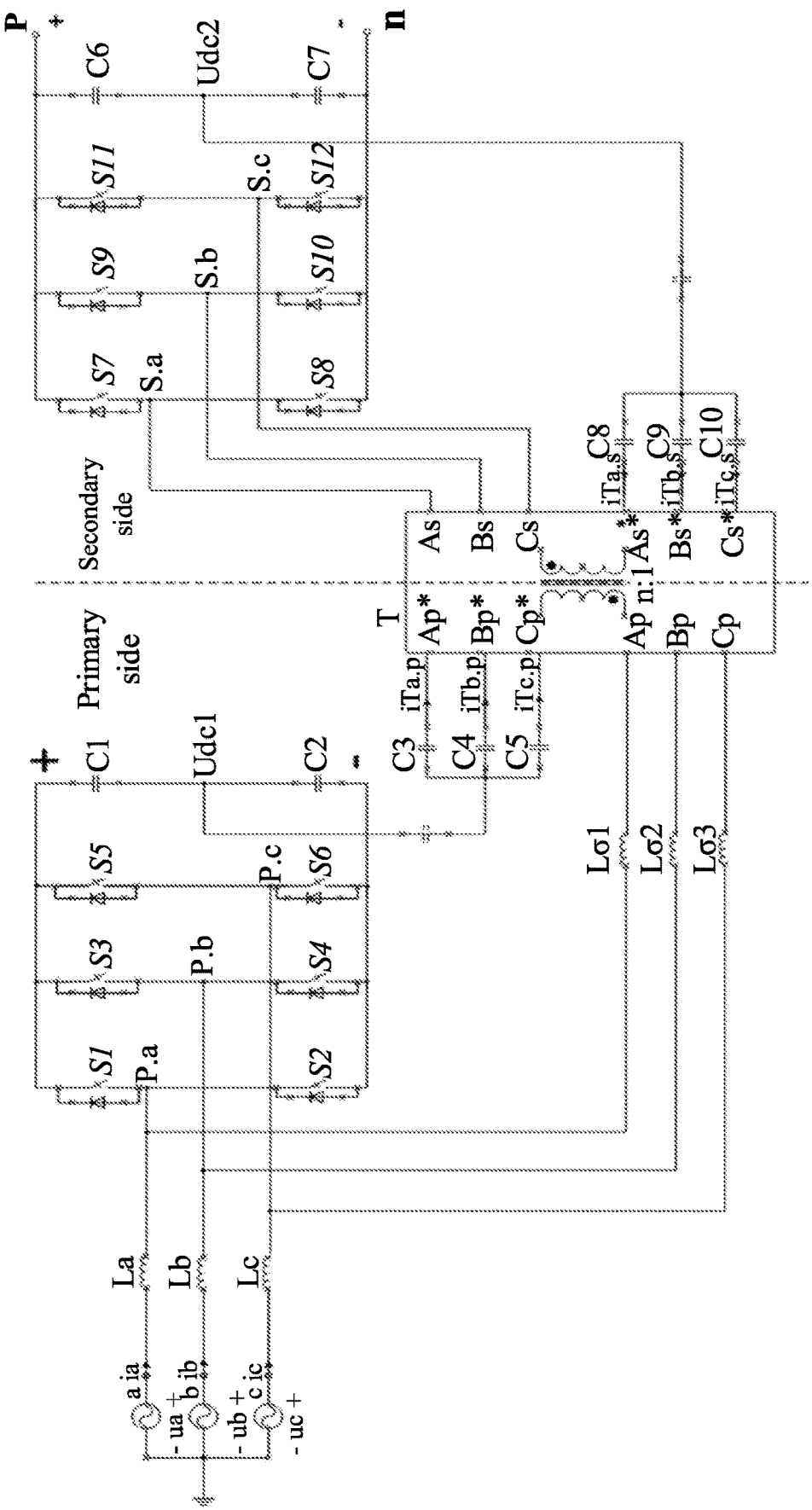
FIG. 1 is a circuit diagram of the present invention.

The present invention discloses a single-stage AC-DC converter circuit with a power factor correction function. Referring to FIG. 1, the single-stage AC-DC converter circuit comprises a primary-side AC-DC converter, a transformer T, a secondary-side AC-DC converter and a controller (not drawn in FIG. 1). The primary AC-DC converter is connected to an external AC power source, and configured to convert the external AC power source into DC, and then supply power to a primary-side winding of the transformer. The transformer T is configured to transfer electric energy, wherein a primary-side winding of the transformer T is connected to a DC output side of the primary-side AC-DC converter and an AC power source, and a secondary-side winding of the transformer T is connected to an AC input side of the secondary-side AC-DC converter and a DC output side of the secondary-side AC-DC converter. The secondary-side AC-DC converter receives electric energy from the secondary-side winding of the transformer, and convert the electric energy into DC and supply power to a load. The controller is configured to control duty ratios of power switches in the primary-side and secondary-side AC-DC converters, and a phase difference between control signals for the power switches in the primary-side and secondary-side AC-DC converters so as to control the amount of electrical energy transfer and correct a power factor.

Figure 2:
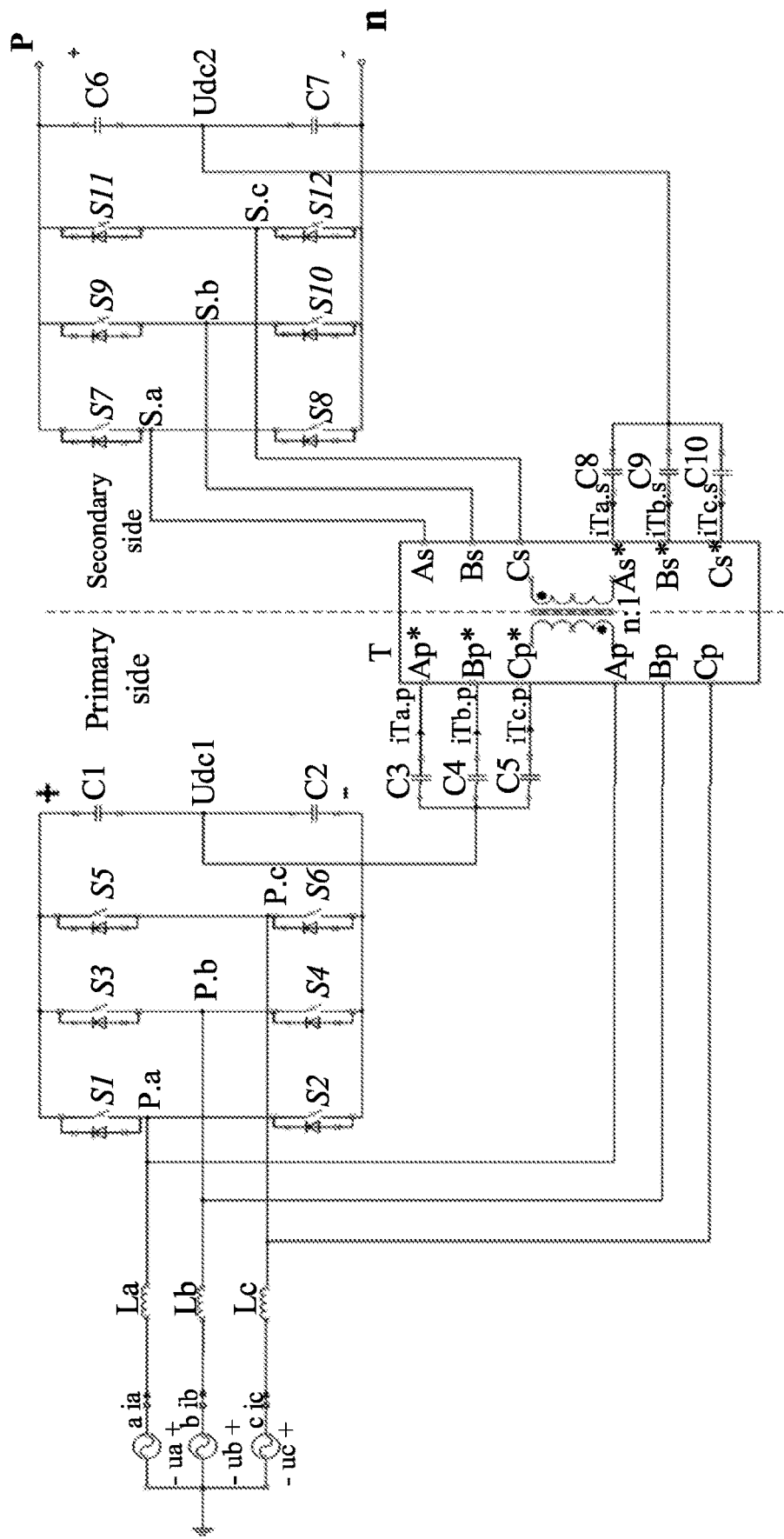
FIG. 2 is a circuit diagram in a preferred embodiment of the present invention.

When it is necessary to supply power to the load, the controller controls the primary-side AC-DC converter to transfer energy to the secondary-side AC-DC converter to form a single-stage AC-DC conversion, thereby realizing voltage-stabilized output on the DC voltage output side, and meanwhile corrects a power factor to minimize the pollution of the input current to a power grid current. Referring to FIG. 1 or FIG. 2, a three-phase power frequency AC power grid transfers energy to a primary-side DC voltage stabilizing circuit (i.e., a first capacitor C1 and a second capacitor C2) in the form of a power frequency voltage and a power frequency current through a primary-side low-pass filter inductor (i.e., an A-phase inductor La, a B-phase inductor Lb, and a C-phase inductor Lc) and the primary-side AC-DC converter. The controller controls the primary-side AC-DC converter to convert the energy stored in the primary-side DC voltage stabilizing circuit into a switching frequency voltage and a switching frequency voltage current, and transfers the energy to the secondary side in the form of a switching frequency voltage and a switching frequency current through the transformer T. The energy will eventually be transferred to the load through the secondary-side AC-DC converter.

In a preferred embodiment, the AC power source is a three-phase alternating current; the primary-side AC-DC converter and the secondary-side AC-DC converter are three-phase bridge-type controllable rectifier circuits; and the transformer is a three-phase transformer. Referring to FIG. 1 or FIG. 2, the primary-side AC-DC converter is composed of first to sixth switching tubes S1 to S6. The first and second switching tubes S1 and S2 are connected in series to form a primary-side A-phase bridge arm, and a connection point therebetween is an A-phase bridge arm input P.a. The third and fourth switching tubes S3 and S4 are connected in series to form a primary side B-phase bridge arm, and a connection point therebetween is a B-phase bridge arm input P.b. The fifth and sixth switching tubes S5 and S6 are connected in series to form a primary side C-phase bridge arm, and a connection point therebetween is a C-phase bridge arm input P.c. The three-phase bridge arms are connected in parallel to form a primary-side three-phase bridge-type controllable rectifier circuit. Gates of the first to sixth switching tubes S1 to S6 are respectively connected to the controller. The secondary-side AC-DC converter is composed of seventh to twelfth switching tubes S7 to S12. The seventh and eighth switching tubes S7 and S8 are connected in series to form a secondary-side A-phase bridge arm, and a connection point therebetween is an A-phase bridge arm input S.a. The ninth and tenth switching tubes S9 and S10 are connected in series to form a secondary-side B-phase bridge arm, and a connection point therebetween is a B-phase bridge arm input S.b. The eleventh and twelfth switching tubes S11 and S12 are connected in series to form a secondary-side C-phase bridge arm, and a connection point therebetween is a C-phase bridge arm input S.c. The three-phase bridge arms are connected in parallel to form a three-phase bridge-type controllable rectifier circuit. Gates of the seventh to twelfth switching tubes S7 to S12 are respectively connected to the controller.

In a preferred embodiment, a first voltage stabilizing module is connected between an anode and a cathode of the DC output side of the primary-side AC-DC converter. The first voltage stabilizing module comprises a first capacitor C1 and a second capacitor C2 which are connected in series; a connection point between the first capacitor C1 and the second capacitor C2 is a primary-side common neutral point, which is respectively connected to the heads of windings in respective phases on the primary side of the transformer through a third capacitor C3, a fourth capacitor C4 and a fifth capacitor C5; the tails of the windings in respective phases are correspondingly connected to respective phase lines (the connection points are P.a, P.b and P.c in FIG. 1 or FIG. 2) of the AC input side of the primary-side AC-DC converter through an A-phase high-frequency inductor Lσa, a B-phase high-frequency inductor Lσb, and a C-phase high-frequency inductor Lσc respectively. A secondary-side voltage stabilizing module is connected between an anode and a cathode of the DC output side of the secondary-side AC-DC converter; the second voltage stabilizing module comprises a sixth capacitor C6 and a seventh capacitor C7 which are connected in series; a connection point between the sixth capacitor C6 and the seventh capacitor C7 is a secondary-side common neutral point, which is respectively connected to the heads of windings in respective phases on the secondary side of the transformer through an eighth capacitor C8, a ninth capacitor C9 and a tenth capacitor C10; the tails of the windings in respective phases are correspondingly connected to respective phase lines (the connection points are S.a, S.b and S.c in FIG. 1 or FIG. 2) of the AC input side of the secondary-side AC-DC converter; and the AC input side of the primary-side AC-DC converter is respectively connected to three phase lines of the AC power source through an A-phase inductor La, a B-phase inductor Lb, and a C-phase inductor Lc.

Referring to FIG. 1, a third capacitor C3, a fourth capacitor C4 and a fifth capacitor C5 on the primary side are connected in a Y shape, wherein the left sides of C3, C4 and C5 are connected at one point, the right sides of C3, C4 and C5 are connected to heads (Ap*, Bp*, Cp*) of windings in respective phases on the primary side of the transformer T, and the tails (Ap, Bp, Cp) of the windings in respective phases are correspondingly connected to respective phase lines (A, B, C) on the AC input side of the primary-side AC-DC converter. Referring to a schematic diagram of the connection of transformer windings shown in FIG. 8, there are three-phase windings A, B, and C on the primary side, wherein Ap*, Bp*, and Cp* are the heads of the windings, and Ap, Bp, and Cp are the tails of the windings. An eighth capacitor C8, a ninth capacitor C9 and a tenth capacitor C10 on the secondary side are connected in a Y shape, wherein the right sides of C8, C9 and C10 are connected at one point, the left sides of C8, C9 and C10 are connected to heads (As*, Bs*, Cs*) of windings in respective phases on the secondary side of the transformer T, and the tail (As, Bs, Cs) of the windings in respective phases are correspondingly connected to respective phase lines on the AC input side of the secondary-side AC-DC converter. Referring to a schematic diagram of the connection of transformer windings shown in FIG. 8, there are three-phase windings A, B, and C on the secondary side, wherein As*, Bs*, and Cs* are the heads of the windings, and As, Bs, and Cs are the tails of the windings.

According to the embodiment as shown in FIG. 1, the AC input side of the primary-side AC-DC converter is correspondingly connected to three phase lines of the AC power source through an A-phase inductor La, a B-phase inductor Lb, and a C-phase inductor Lc, respectively. The A-phase inductor La, the B-phase inductor Lb, and the C-phase inductor Lc are filter inductors having a low-pass characteristic.

Referring to the preferred embodiment as shown in FIG. 1, the A-phase high-frequency inductor Lσa, the B-phase high-frequency inductor Lσb, and the C-phase high-frequency inductor Lσc are made into leakage inductors and integrated in the converter. The A-phase high-frequency inductor Lσa, the B-phase high-frequency inductor Lσb, and the C-phase high-frequency inductor Lσc are filter capacitors having a high-pass characteristic. Due to the high-pass characteristic of a high-pass filter circuit, the voltages on the capacitors in respective phases, which are connected in a star shape, are clamped by voltages in respective phases of the three-phase AC power grid.

Referring to a schematic diagram of the connection of transformer windings shown in FIG. 8, the converter has an A phase, a B phase and a C phase, wherein a primary-side winding and a secondary-side winding of the A phase are wound on an A-phase magnetic column; a primary-side winding and a secondary-side winding of the B phase are wound on a B-phase magnetic column; and a primary-side winding and a secondary-side winding of the C phase are wound on a C-phase magnetic column. The transformer T plays an isolation role and integrates the three phases together.

Figure 3:
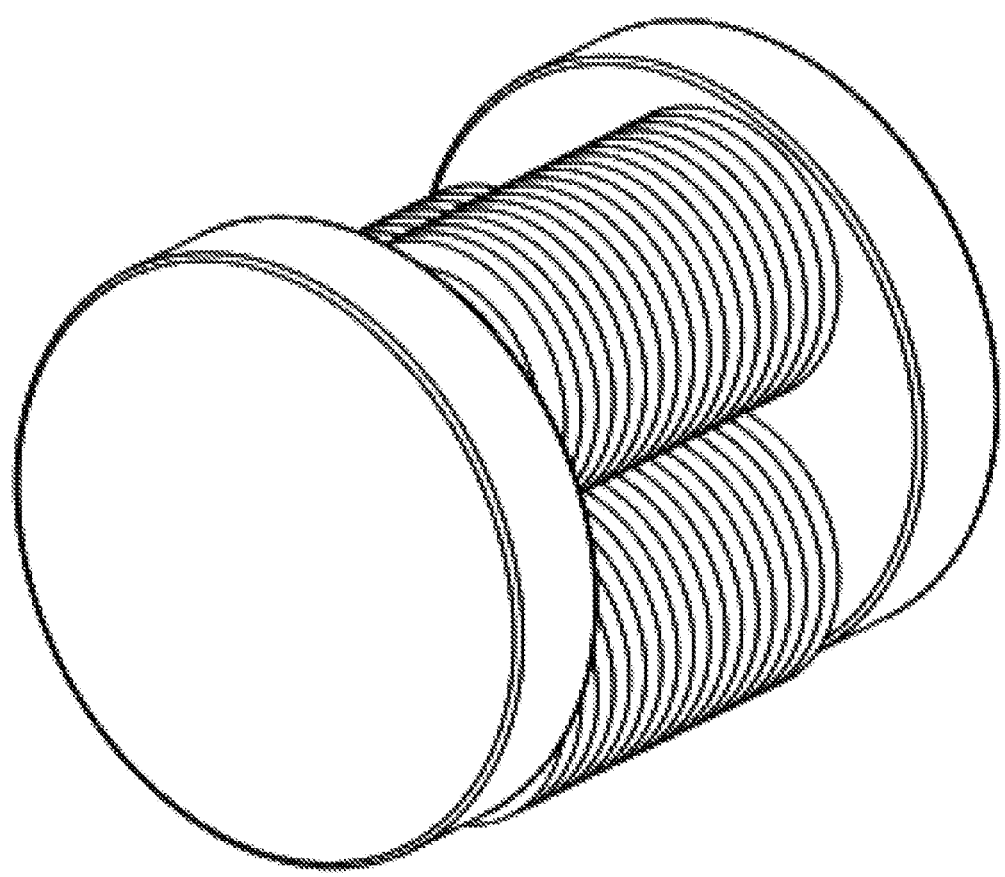
FIG. 3 is a structural diagram in which magnetic columns of a transformer are arranged in a triangular shape.

In the embodiment as shown in FIG. 3, the axes of the A-phase, B-phase and C-phase magnetic columns are arranged in a triangular shape, and the three magnetic columns share a top magnetic circuit and a bottom magnetic circuit. The three magnetic columns are placed independently and symmetrically, and share the top and bottom magnetic circuits. This design can effectively increase a utilization rate of a magnetic material, reduce the cost of the magnetic material, balance the magnetic flux between the phases, and effectively improve the efficiency.

Figure 4:
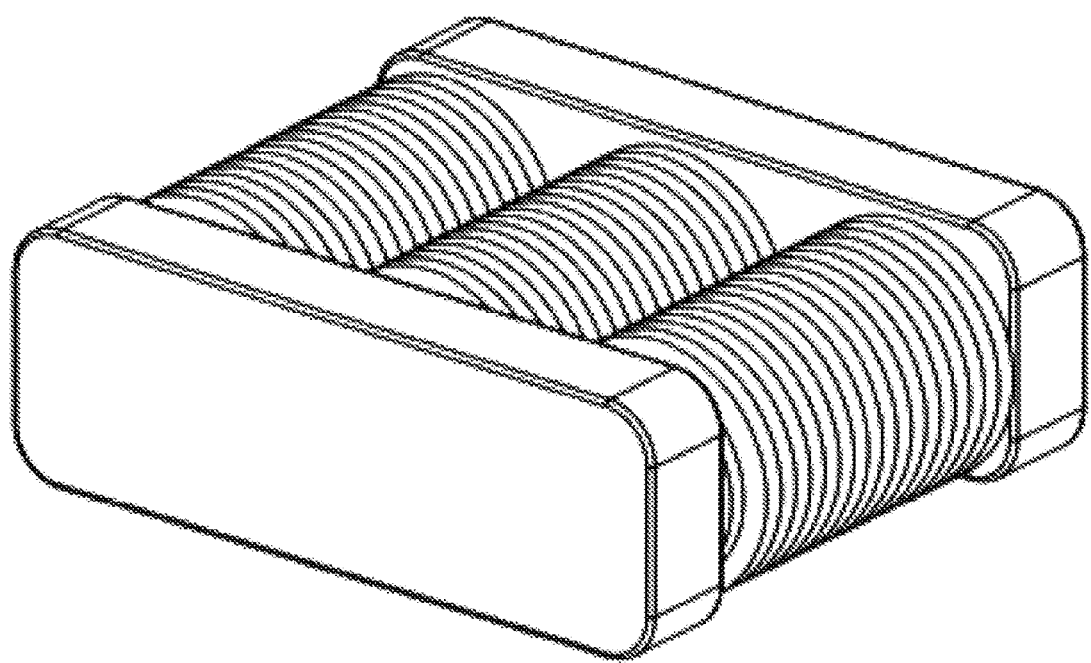
FIG. 4 is a structural diagram in which magnetic columns of the transformer are arranged in a straight line.

In the embodiment as shown in FIG. 4, the axes of the A-phase, B-phase and C-phase magnetic columns are arranged in a straight line, and the three magnetic columns share a top magnetic circuit and a bottom magnetic circuit. The three magnetic columns are placed independently side by side, and share the top and bottom magnetic circuits. This design can effectively increase a utilization rate of a magnetic material, and reduce the cost of the magnetic material. Although the three magnetic columns are placed asymmetrically, the shape is more regular, which is convenient for optimizing the heat dissipation capacity.

In the preferred embodiment, the power switches in the primary-side AC-DC converter and the secondary-side AC-DC converter are silicon carbide switches.

In the preferred embodiment, the controller drives the control signals for the power switches in the primary-side AC-DC converter and the secondary-side AC-DC converter to adopt the same switching frequency.

The operating principle of the preferred embodiment is described below with reference to FIG. 2.

When the AC-DC converter circuit operates stably, the controller controls the power switches of the three-phase bridge-type controllable rectifier circuit on the primary side and the power switches of the three-phase bridge-type controllable rectifier circuit on the secondary side to be turned on alternately, and controls a turned-on duty ratio and turned-on phase shifts of the bridge arms of the corresponding phases on the primary side and the secondary side, so as to realize the energy transmission from the primary side to the secondary side.

Since the controller controls the power switches of the three-phase bridge-type controllable rectifier circuits on the primary side and the secondary side to operate in a high-frequency switching state, both a primary-side circuit and a secondary-side circuit in the AC-DC converter circuit will produce high-frequency voltage oscillations at the switching frequency, and the high-frequency voltage oscillations on the secondary side are mapped to the primary side through the three-phase transformer and then superimposed, with the high-frequency voltage oscillations on the primary side, on the high-frequency inductors Lσa, Lσb, and Lσc in the A, B, and C phases. The duty ratio and phase shift of the high-frequency voltage oscillations on the primary side and the high-frequency voltage oscillations on the secondary side are determined by the controller. Therefore, controllable high-frequency current ripples will be generated on the high-frequency inductors Lσa, Lσb, and Lσc in the A, B, and C phases, and the energy transmission between the primary side and the secondary side is realized through a three-phase coupling transformer T.

Due to the effect of primary-side low-pass filter inductance circuits (La, Lb, Lc), a high-frequency ripple current will not directly impact the power grid current, but is conducted through the primary-side high-pass filter circuits (Lσa, Lσb, Lσc) and then absorbed by the primary-side capacitors C3 to C5 and the primary-side capacitors C1 and C2, such that the amount of charges on the first to fifth capacitors C1 to C5 on the primary side increases or decreases. The A-phase inductor La, the B-phase inductor Lb, and the C-phase inductor Lc respectively produce a voltage difference across two ends, which changes an output current of the three-phase power grid.

By changing the turned-on duty ratios of the primary-side and secondary-side three-phase bridge-type controllable rectifier circuits and the turned-on phase shifts between the bridge arms in respective phages on the primary side and the secondary side, the amplitude and duration of the high-frequency ripple current of each phase can be controlled, to further control the amount of charge change on the first to fifth capacitors C1 to C5. Therefore, the currents on the A-phase filter inductor La, the B-phase filter inductor Lb, and the C-phase filter inductor Lc are respectively controlled to achieve the purpose of power factor correction.

The AC-DC converter circuit is a three-phase integrated transformer which is configured to couple the primary side and the secondary side. In order to ensure the maximum power transmission efficiency, according to a voltage Udc1 of the primary-side DC voltage stabilizing circuit and a voltage Udc2 of the secondary-side DC voltage stabilizing circuit during rated operation, a transformation ratio between the primary side and the secondary side of the transformer is designed as:

$$n = \frac{Udc1}{Udc2}.$$

The AC-DC converter circuit drives a control signal for the primary-side three-phase bridge-type controllable rectifier circuit to have the same switching frequency with a control signal for the secondary-side three-phase bridge-type controllable rectifier circuit. By controlling the phase difference between the two sets of control signals, the electric energy transferred between the primary-side circuit and the secondary-side circuit can be controlled.

Taking the A-phase bridge arms on the primary side and the secondary side as an example, in a switching period Ts, a turned-on duty ratio of the primary side and the secondary side is D1=D2=D, the phase difference is φ, and the high-frequency inductors of the primary-side high-pass filter circuits in the A, B, and C phases satisfy:
Lσa=Lσb=Lσc=Lσ. Because of n·Udc2=Udc1, the amplitude of the switching frequency current within one switching cycle is:

$$I_{L\sigma a max} = \frac{0.5 \cdot Udc1}{L\sigma a} \cdot \frac{\varphi T_s}{2\pi} = \frac{n \cdot 0.5 \cdot Udc2}{L\sigma a} \cdot \frac{\varphi T_s}{2\pi}$$

The average current in one switching cycle is:

$$I_{L\sigma a} = D \cdot I_{L\sigma a max} = \frac{0.5 \cdot Udc1}{L\sigma a} \cdot \frac{\varphi T_s D}{2\pi} = \frac{n \cdot 0.5 \cdot Udc2}{L\sigma a} \cdot \frac{\varphi T_s D}{2\pi}$$

Therefore, the duty ratio is controlled to be related to the input power frequency AC $v_{oc}(t)=V_{peak} \sin[2\pi(50 \text{ Hz})t]$, in which, Vac(t) is a real-time input voltage, Vpeak is a peak value of the input voltage, and t is the time. An current of an input system can be controlled to change synchronously with an input power frequency AC voltage by changing the duty ratio, and it is derived:

$$D1 = D2 = D = \frac{1}{2}\left(1 + \frac{v_{ac}(t)}{0.5 \cdot Udc1}\right)$$

The relationship between the total output power Pout and the single-phase power PΦ of the three-phase isolated AC-DC converter circuit provided by the present invention is:
$P_\Phi = P_{out}/3$.

Based on the relationship between single-phase voltage and current, when the switching frequency is fs, it is derived:

$$P_\Phi = \frac{n \cdot Udc1 \cdot Udc2}{2f_s \cdot L_\sigma} \cdot \frac{\varphi}{2\pi}\left[\frac{1}{2} - \left(\frac{V_{peak}}{Udc1}\right)^2 - \frac{|\varphi|}{2\pi}\right]$$

In order to ensure that the circuit can operate normally within the entire power frequency cycle, it is necessary to limit the high-frequency inductance Lσ:

$$L_\sigma < \frac{n \cdot Udc1 \cdot Udc2}{8 \cdot f_s \cdot P_\Phi}\left[\frac{1}{4} - \left(\frac{V_{peak}}{Udc1}\right)^2\right]$$

According to the AC-DC converter circuit provided by the present invention as shown in FIG. 1, in this embodiment, the high-frequency inductors Lσa, Lσb, and Lσc of the primary-side high-pass filter circuit in the A, B, and C phases are integrated in the three-phase transformer through a manufacturing process as leakage inductors of the transformer, so as to control the energy transmission between the primary side and the secondary side.

Figure 5:
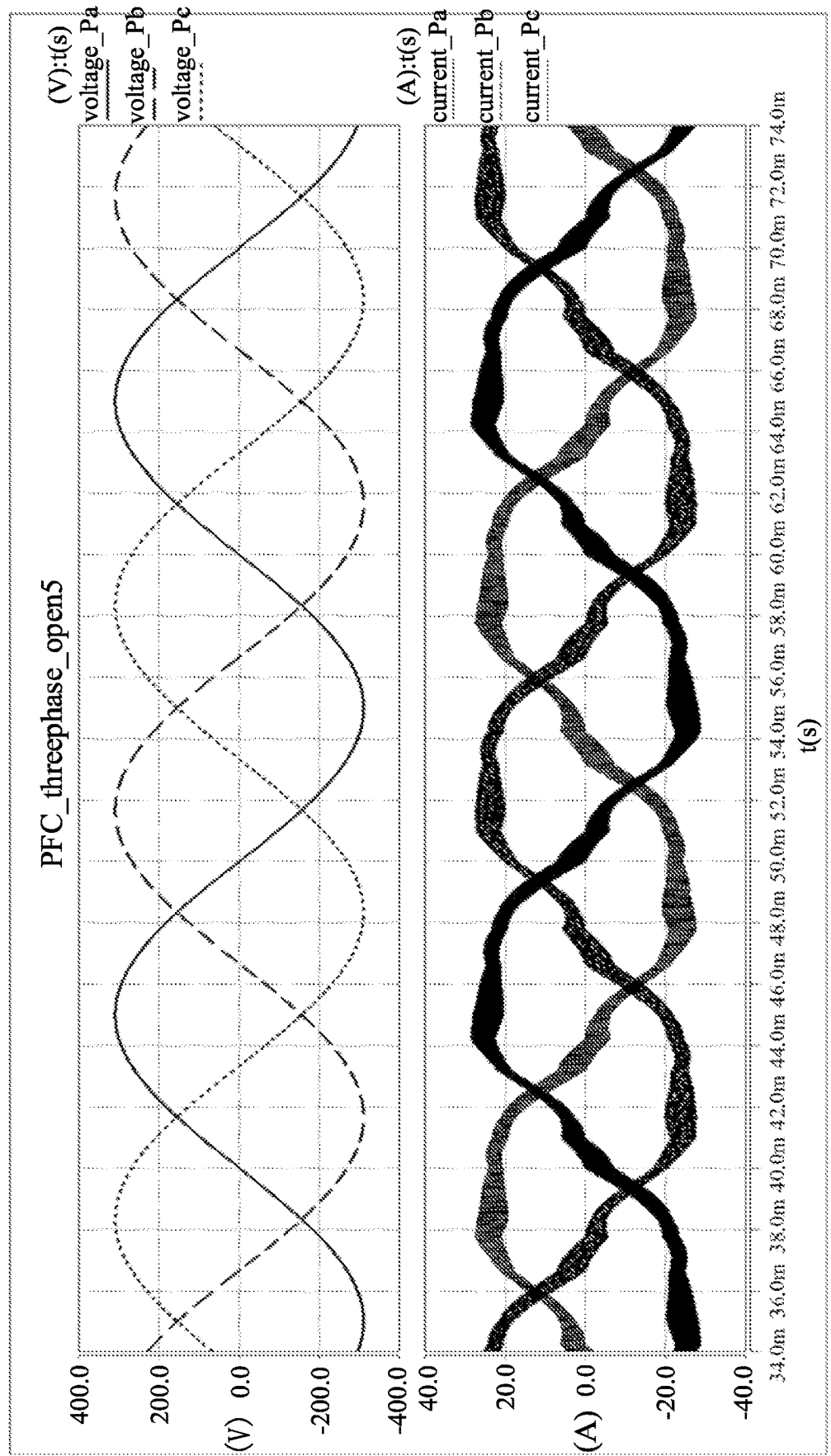
FIG. 5 is a waveform diagram of a three-phase voltage and an input current on an input side in the present invention.

When the converter of the present invention operates stably, the phase voltage and phase current waveforms of the three-phase AC input terminal are shown in FIG. 5, wherein the input three-phase current basically changes with the sine law, and the phase of the three-phase current is basically identical with the phase of the input phase voltage. The closed-loop control of the converter can optimize the input current waveforms and better track the phase of the input voltage. The input current contains high-frequency components of a switching frequency, which are generated by the operation of the three-phase bridge-type controllable rectifier circuit on the primary side.

Figure 6:
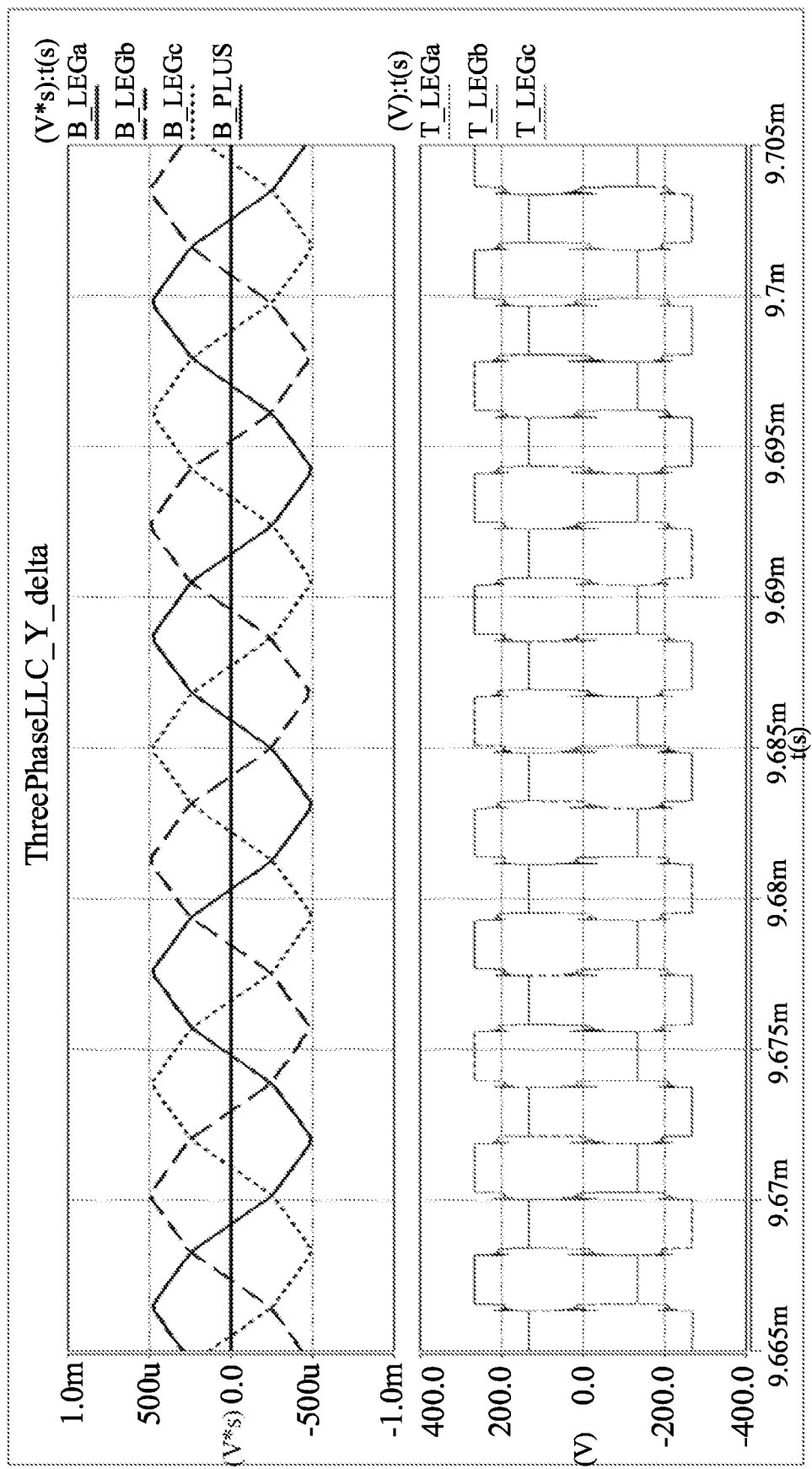
FIG. 6 is a voltage and magnetic flux waveform on a three-phase transformer used in the present invention.
Figure 7:
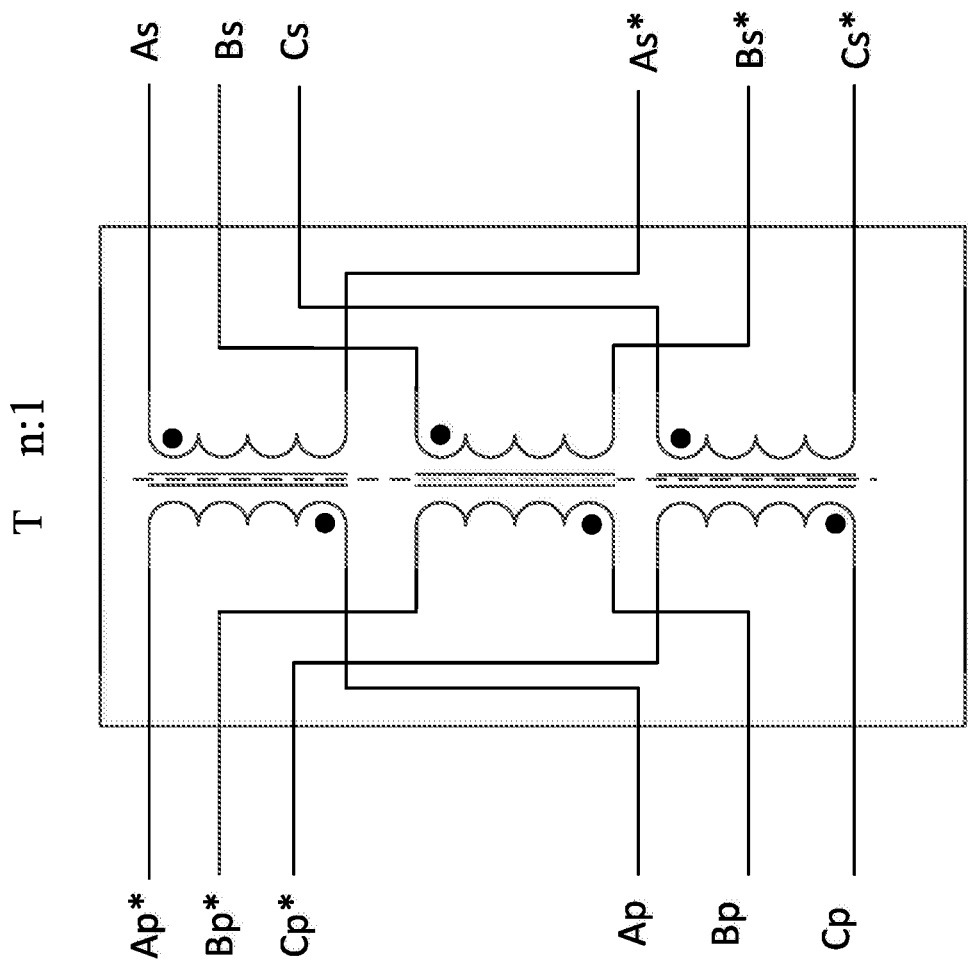
FIG. 7 is a schematic diagram of the connection of transformer windings.

The three-phase voltage and three-phase magnetic flux waveforms on the three-phase integrated transformer when the converter circuit operates stably shown in FIG. 6. T_LEGa is a voltage on a primary-side winding of an A-phase transformer, T_LEGb is a voltage on a primary-side winding of an B-phase transformer, and T_LEGc is a voltage on a primary-side winding of a C-phase transformer. According to the volt-second product principle: $N \cdot B \cdot S = \int v dt$, the magnetic fluxes of respective phases of the three-phase transformer are obtained. Referring to FIG. 7, B_LEGa is an A-phase magnetic flux, B_LEGb is a B-phase magnetic flux, B_LEGc is a C-phase magnetic flux, and the sum of the three-phase magnetic fluxes is B_PLUS. Due to the balance of the magnetic fluxes in the three phases, B_PLUS is basically 0, which enables the three-phase integrated transformer to realize a natural magnetic equalization function.

The above embodiments are only for an exemplary purpose, rather than a limiting purpose. Any equivalent modifications or changes, without departing from the spirit and scope of this application, shall be included in the scope of the claims of this application.

What is claimed is:

1. A single-stage AC-DC converter circuit with a power factor correction function, comprising a primary-side AC-DC converter, a transformer, a secondary-side AC-DC converter and a controller, wherein
the primary AC-DC converter is configured to convert an AC power source into DC, and then supply power to a primary-side winding of the transformer;
the primary-side winding of the transformer is connected to a DC output side of the primary-side AC-DC converter and the AC power source, and a secondary-side winding of the transformer is connected to an AC input side of the secondary-side AC-DC converter and a DC output side of the secondary-side AC-DC converter;
the secondary-side AC-DC converter is configured to receive electric energy from the secondary-side winding of the transformer, and convert the electric energy into DC and supply power to a load; and
the controller is configured to control duty ratios of power switches in the primary-side and secondary-side AC-DC converters, and a phase difference between control signals for the power switches in the primary-side and secondary-side AC-DC converters so as to control the amount of electrical energy transfer and correct a power factor.

2. The single-stage AC-DC converter circuit with the power factor correction function according to claim 1, wherein, the AC power source is a three-phase alternating current; the primary-side AC-DC converter and the secondary-side AC-DC converter are three-phase bridge-type controllable rectifier circuits; and the transformer is a three-phase transformer.

3. The single-stage AC-DC converter circuit with the power factor correction function according to claim 2, wherein
a first voltage stabilizing module is connected between an anode and a cathode of the DC output side of the primary-side AC-DC converter; the first voltage stabilizing module comprises a first capacitor C1 and a second capacitor C2 which are connected in series; a connection point between the first capacitor C1 and the second capacitor C2 is a primary-side common neutral point, which is respectively connected to the heads of windings in respective phases on the primary side of the transformer through a third capacitor C3, a fourth capacitor C4 and a fifth capacitor C5; the tails of the windings in respective phases are correspondingly connected to respective phase lines of the AC input side of the primary-side AC-DC converter through an A-phase high-frequency inductor Lσa, a B-phase high-frequency inductor Lσb, and a C-phase high-frequency inductor Lσc respectively; and
a second voltage stabilizing module is connected between an anode and a cathode of the DC output side of the secondary-side AC-DC converter; the second voltage stabilizing module comprises a sixth capacitor C6 and a seventh capacitor C7 which are connected in series; a connection point between the sixth capacitor C6 and the seventh capacitor C7 is a secondary-side common neutral point, which is respectively connected to the heads of windings in respective phases on the secondary side of the transformer through an eighth capacitor C8, a ninth capacitor C9 and a tenth capacitor C10; the tails of the windings in respective phases are correspondingly connected to respective phase lines of the AC input side of the secondary-side AC-DC converter.

4. The single-stage AC-DC converter circuit with the power factor correction function according to claim 3, wherein, the AC input side of the primary-side AC-DC converter is respectively connected to three phase lines of the AC power source through an A-phase inductor La, a B-phase inductor Lb, and a C-phase inductor Lc.

5. The single-stage AC-DC converter circuit with the power factor correction function according to claim 3, wherein the A-phase high-frequency inductor Lσa, the B-phase high-frequency inductor Lσb, and the C-phase high-frequency inductor Lσc are made into leakage inductors and integrated in the converter.

6. The single-stage AC-DC converter circuit with the power factor correction function according to claim 3, wherein the converter has an A phase, a B phase and a C phase; a primary-side winding and a secondary-side winding of the A phase are wound on an A-phase magnetic column; a primary-side winding and a secondary-side winding of the B phase are wound on a B-phase magnetic column; and a primary-side winding and a secondary-side winding of the C phase are wound on a C-phase magnetic column.

7. The single-stage AC-DC converter circuit with the power factor correction function according to claim 6, wherein the axes of the A-phase, B-phase and C-phase magnetic columns are arranged in a triangular shape, and the three magnetic columns share a top magnetic circuit and a bottom magnetic circuit.

8. The single-stage AC-DC converter circuit with the power factor correction function according to claim 6, wherein the axes of the A-phase, B-phase and C-phase magnetic columns are arranged in a straight line, and the three magnetic columns share a top magnetic circuit and a bottom magnetic circuit.

9. The single-stage AC-DC converter circuit with the power factor correction function according to claim 1, wherein the power switches in the primary-side AC-DC converter and the secondary-side AC-DC converter are silicon carbide switches.

10. The single-stage AC-DC converter circuit with the power factor correction function according to claim 1, wherein, the controller drives the control signals for the power switches in the primary-side AC-DC converter and the secondary-side AC-DC converter to adopt the same switching frequency.

\* \* \* \* \*